Aug. 21, 1923.

R. C. NEVIN 1,465,453

AUTOMATIC MILLING MACHINE

Filed Jan. 28, 1920  3 Sheets-Sheet 2

INVENTOR,
Robert C. Nevin,
BY Howard S. Smith
His ATTORNEY.

Aug. 21, 1923.          1,465,453
R. C. NEVIN
AUTOMATIC MILLING MACHINE
Filed Jan. 28, 1920        3 Sheets-Sheet 3

INVENTOR.
Robert C. Nevin,
BY Howard S. Smith
ATTORNEY.

Patented Aug. 21, 1923.

1,465,453

UNITED STATES PATENT OFFICE.

ROBERT C. NEVIN, OF DAYTON, OHIO.

AUTOMATIC MILLING MACHINE.

Application filed January 28, 1920. Serial No. 354,598.

*To all whom it may concern:*

Be it known that I, ROBERT C. NEVIN, a citizen of the United States, residing at Dayton, in the county of Montgomery and State of Ohio, have invented certain new and useful Improvements in Automatic Milling Machines, of which the following is a specification.

The principal object of my invention is to provide an automatic milling machine in which nuts may be castellated, sparkplugs may be faced and other objects milled without the necessity of the operator positioning them each time a new cutting operation is to be performed. My invention contemplates the placing of the object to be milled in a collet carried past a series of cutters by an endless carrier, and an indexing mechanism for automatically turning the collet to a new position before a succeeding cutting operation is performed upon the object which it holds.

A further object of my invention is to provide means for automatically locking the collet in a fixed position while the cutting operation is being performed upon the object which it contains, and thereafter automatically unlocking it so that it may be turned to a new position by the indexing mechanism.

Another object of my invention is the provision of means for automatically accelerating the speed of the collet between the cutters, and diminishing it during the milling operation.

Other important and incidental objects will be brought out in the following specification, and particularly set forth in the subjoined claims.

Figure 1:
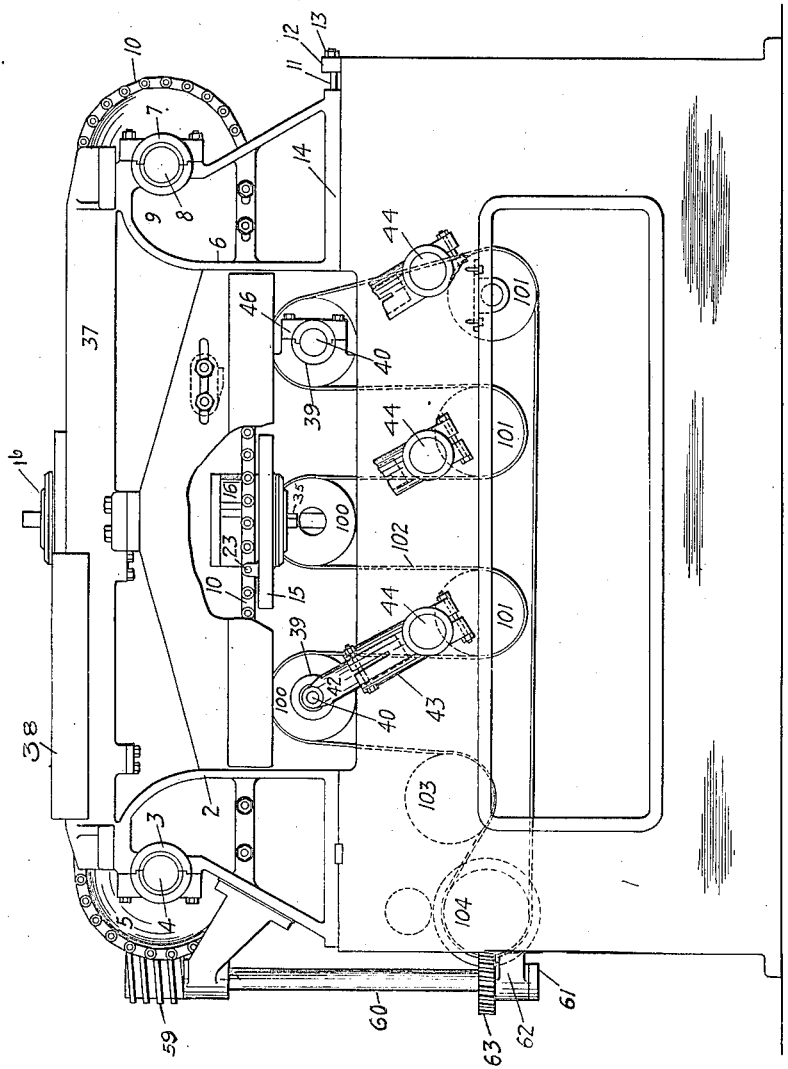
Figure 2:
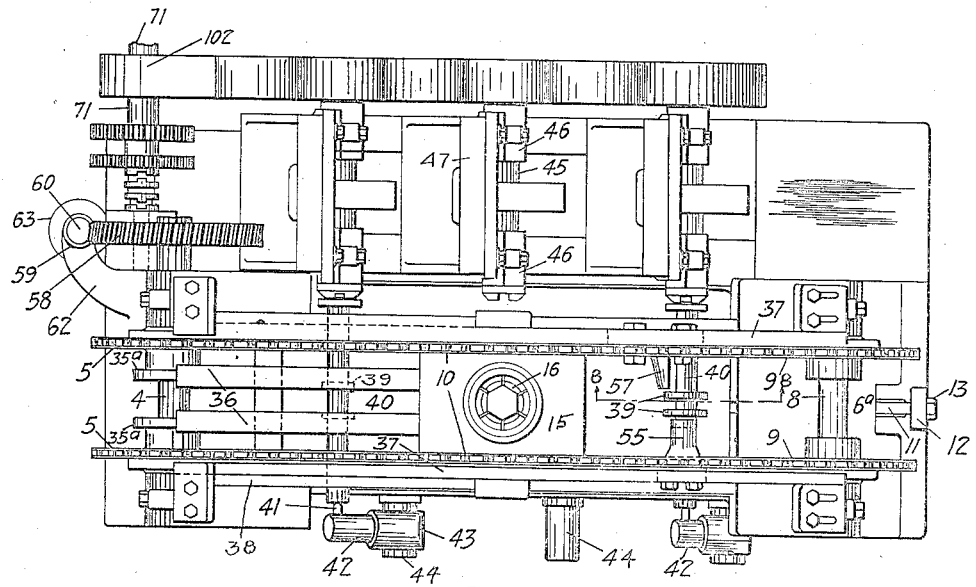
Figure 3:
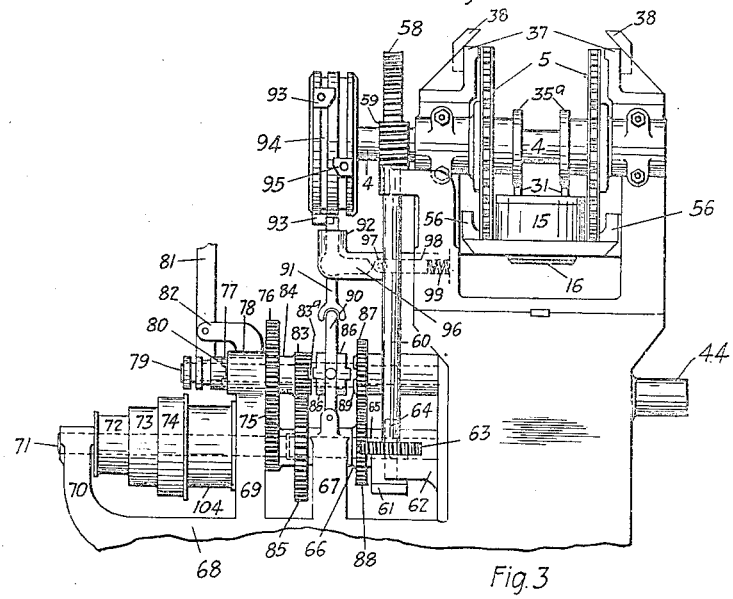
Figure 5:
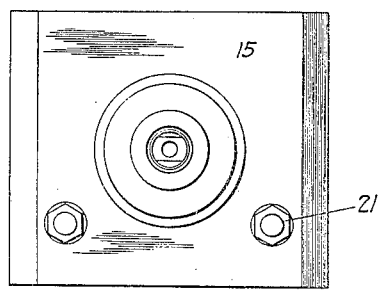
Figure 4:
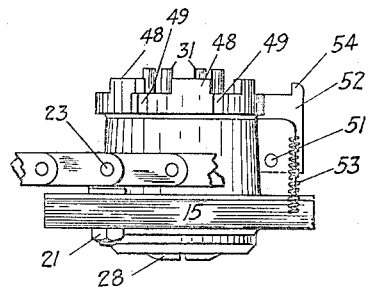
Figure 6:
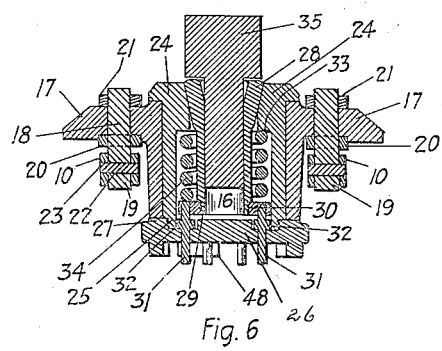
Figure 8:
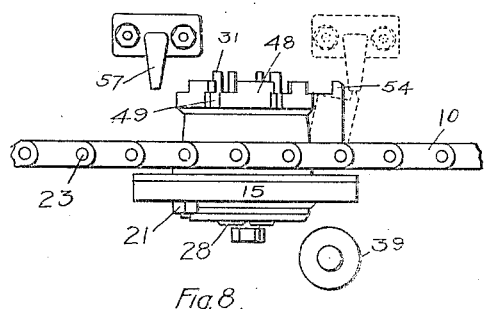
Figure 7:
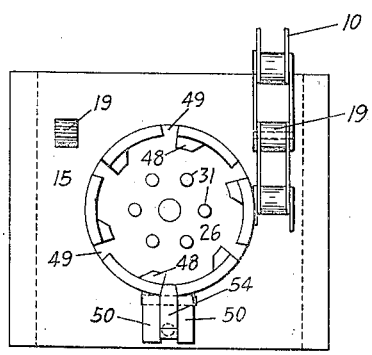

One form of embodiment of my invention is illustrated in the accompanying drawings, of which Figure 1 is a side elevational view, partly broken away, of my improved automatic milling machine. Figure 2 is a top plan view of the same. Figure 3 is an end view of the machine. Figure 4 is a side elevational view of the collet supporting means. Figure 5 is a bottom plan view thereof. Figure 6 is a sectional view through said collet in its inverted position. Figure 7 is a top plan view of the collet and supporting means. And Figure 8 is a side view looking inwardly from the line 8—8 of Figure 2.

Throughout the specification and drawings, similar reference characters denote corresponding parts.

Referring to the accompanying drawings, the numeral 1 designates the bed of my improved automatic milling machine. Fixedly mounted upon one end of the bed 1 is a pair of brackets 2, 2 having inclined front portions and forwardly turned heads in which are secured bearings 3, 3 for a shaft 4 upon which are fixedly secured a pair of sprocket wheels 5, 5 spaced a suitable distance apart.

A pair of brackets 6, 6 similar to the brackets 2, 2, project upwardly from a base plate 6ª longitudinally movable over the upper surface of the bed 1. Within the heads of the brackets 6, 6 are secured bearings 7, 7 for a shaft 8 upon which is fixedly secured a pair of sprocket wheels 9, 9. For the purpose of adjusting the tension of sprocket chains 10, 10 that pass around the sprocket wheels 5, 5 and the sprocket wheels 9, 9, the base plate 6ª may be moved longitudinally upon the top surface of the bed 1 by a stud 11 that is threaded through a lug 12 on said bed, and which receives on its outer end a nut 13.

Secured to the endless sprocket chains 10, 10 at suitable distances apart, are supporting members 15 for horizontally rotatable collets 16. Each collet supporting member 15 comprises a tubular casting having an outer flanged part 17 through holes in which there are passed the threaded shank portions 18 of apertured ear pieces 19. On each of these ear pieces 19 there is a shoulder 20 that is adapted to be drawn tightly against the inner portion of the flanged part 17 by a nut 21 on the outer end of the threaded shank portion of the ear piece. (See Figures 4, 5 and 6.) Through transverse apertures 22 in the ear pieces 19, pins 23 that connect the links of the sprocket chains 10, 10 together, are passed for the purpose of firmly securing the collets 16 between the chains in a position to pass freely between the sprocket wheels 5, 5 and 9, 9 when the chains travel around the latter.

Within the tubular portion of the casting 15, a sleeve 24 is adapted to be rotated around a vertical axis, the outer end of said sleeve terminating in an externally threaded neck portion 25 upon which is screwed a lid-shaped member 26. When the latter has been screwed onto the sleeve 24, it will be free to rotate with the latter, with the outer end of the tubular portion of the casting 15 as a bearing for its flanged part 27.

The gripping portion 28 of the collet comprises the usual split sections that terminate at their inner end in a solid sleeve portion 29 that screws into a collar 30 vertically movable within the inner portion of the sleeve 24.

Projecting through holes in the member 26 are plungers 31 whose inner ends enter holes in the collar 30. Annular enlargements 32 on the plungers 31 limit their outward movement through engagement with the outer surface of the member 26. Surrounding the expansible portion 28 of the collet between an annular shoulder 33 formed on the inner portion of the sleeve 24, and the collar 30, is a spring 34 normally adapted to press against the collar for the purpose of forcing, by means of it, the gripping portion 28 of the collet into the sleeve. The outer ends of the collet sections taper outwardly to form together a surface which, when the collet is forced into the sleeve 24, will engage the converging mouth portion of the latter. As the collet is forced into the sleeve, its converging mouth portion will therefore press the split sections 28 of the collet inwardly to cause them firmly to grip a spark plug 35 or other object that it may be desired to hold for the milling operations to follow. (See Figure 6.)

When the collet 16 is being carried upwardly by the sprocket chains 10, 10, it is gradually turned to its full inverted position shown in Figure 6. As the collet starts to turn, the outer ends of the plungers 31 engage a pair of annular elements 35ª on the shaft 4, by which they will be depressed. When the plungers 31 are thus depressed, they will press the collar 30, and through it the collet 16, outwardly a sufficient distance to cause the latter to release the object which has been milled. The outer ends of the plungers 31 then engage a pair of longitudinal members 36 of sufficient length to hold said plungers in their depressed positions long enough for another object to be inserted in the collet, after which the spring 34 will force the collet into the sleeve 24 a sufficient distance to firmly grip that object for the milling operations to follow. (See Figures 2 and 3.)

During its travel from the tops of one pair of sprocket wheels to the other, the collet supporting member's flange part 17 will travel over a pair of track members 37, 37 beneath the inclined upper ends of a pair of gibs 38, 38 to relieve the sprocket chains of the collet's weight.

The collet with the object to be milled firmly held within it, is gradually turned, during its descending movement around the sprocket wheels, to the position shown in Figure 4. Disposed beneath the lower run of the sprocket chains 10, 10 are a series of rotatable cutters 39, each of which is in the path of the object to be milled that is carried by the collet. Each pair of cutters 39 is fixedly secured on an arbor 40 that is made longitudinally and vertically adjustable by the following means.

The outer end of each arbor 40 is received by a center 41 that projects inwardly, at right angles, from a cylindrical support 42 that telescopes into a sleeve 43 that rotates on a fixed plug 44 secured to the bed 1. The other end of each arbor 40 is received by a hollow spindle 45 supported by journals 46, 46 vertically adjustable in a bracket 47 that is longitudinally movable on the bed 1. Since the spindles 45 are thus longitudinally and vertically movable, and the centers 41 may be moved longitudinally by the telescoping supports 42 and vertically by the rotating sleeves 43, it is possible to vary the longitudinal and vertical positions of the arbors 40 for the purpose of adjusting them to the work.

For the purpose of turning the work to a new position before a milling operation is performed upon, it by each pair of cutters, the following means are provided. Referring to Figures 4 and 7, there is formed on the top of the member 26 a series of circumferentially disposed lugs 48 between which are wide spaces. Provided in the outer periphery of the member 26 are a series of slots 49. Projecting outwardly from the tubular portion of the casting 15 is a pair of bosses 50, 50 through which passes a transverse pin 51 on which is pivotally mounted the lower end of a locking piece 52 whose upper inner end is normally pressed into one of the slots 49 by a spring 53, to prevent the collet from being turned during the milling operation. Formed on the upper outer end of the locking piece 52 is a shoulder 54 that is adapted to be engaged by a lateral disposed tripping member 55 bolted to a longitudinal guide 56. There are two of these guides 56 one for the lower run of each sprocket chain 10, the tripping member 55 being secured to the outer guide 56, while to the inner one there is bolted a transverse engaging element 57.

The tripping members 55 are so disposed that the shoulder 54 on the locking piece 52 for each collet, will engage one of them after each milling operation upon the object carried by the collet has been performed. When the shoulder 54 is engaged by one of these tripping members 55, the inner end of the locking piece 52 will be withdrawn from a respective slot 49 in the periphery of the member 26. Thereafter, while the collet is being turned, the inner free end of the locking piece will be held out of one of the slots 49 by its engagement with the outer periphery of the member 26 between two of said slots.

Immediately after the locking end of the piece 52 has been withdrawn from a slot 49, the collet is free to be turned as follows. Projecting into the path of one of the lugs 48 is the engaging element or index pin 57. When one of the lugs 48 is brought into engagement with said pin during the forward travel of the collet, the latter, now free to turn, is rotated by said index pin to a position to bring an unmilled portion of the object into a proper position to be operated on by the next pair of cutters. As soon as that position has been attained, the locking end of the piece 52 will have reached the limit of its travel along the outer periphery of the member 26, whereupon it will be pressed into the next slot 49 by the upward pressure of the spring 53 whose lower end is seated in a recess in the casting 15. The collet will thus be locked from turning until it is again ready to be indexed for another milling operation after the one for which it has just been prepared, is completed. (See Figures 1, 2, 4 and 7.)

The following means are provided for the purpose of turning the sprocket wheels 5, 5 by which the endless chains 10, 10 are moved to carry the collets past the cutters. Referring to Figures 2 and 3, there is fast on the shaft 4 beyond the inner bracket 2, a worm wheel 58 in mesh with a worm 59 on a vertical shaft 60 journaled at its lower end in a bearing 61 secured to a bracket 62 supported by the bed 1. On the lower end of the vertical shaft 60 is a worm wheel 63 in mesh with a worm 64 on a horizontal shaft 65. The latter shaft is journaled in a bearing 66 supported by a bracket 67 mounted upon a base 68.

By means now to be described, the shaft 65 is driven at different rates of speed to accelerate the movement of the collets when they are traveling between the cutters 39, and to diminish the rate of that movement while the cutting operations are being performed. Journaled in bearings in brackets 69 and 70 projecting upwardly from the base 68 is a shaft 71 upon whose outer end are fast a series of stepped cone pulleys 72, 73 and 74 adapted to be driven by a prime mover not shown. Fast on the inner end of the shaft 71 is a pinion 75 in mesh with a gear 76 having a rearwardly projecting sleeve portion 77 that is journaled in a bearing 78 on the upper end of the bracket 69. The gear 76 and its sleeve portion loosely turns on a countershaft 79 to which it may be connected for the purpose of rotating the latter by a clutch 80 slidable along the shaft 79. The clutch 80 is adapted to be operated by a lever 81 pivoted to a bracket 82, for the purpose of stopping the feed mechanism when desired.

Loosely mounted on the counter shaft 79 is a gear 83 and its hub portion 84, said gear being in mesh with a gear 85 fast on the shaft 65. Formed on the face of the gear 83 are dogs 83ª adapted to be engaged by a dog clutch 86 slidable on the counter shaft 79 between the gear 83 and a larger gear 87 loosely mounted on said shaft and meshing with a pinion 88 fast on the shaft 65.

The dog clutch 86 is adapted to be shifted along the counter shaft 79 to engage the dogs 83ª on the gear 83, or dogs 89 formed on the face of the gear 87 by a shifting yoke 90 whose upper end is received by the forked end of a shifting lever 91 pivoted to a bracket 92. The upper end of the lever 91 is adapted to be thrown in one direction by lugs 93 on one side of the outer periphery of a drum 94 fast on the outer end of the sprocket shaft 4, and in the opposite direction by lugs 95 on the other side of said drum. The lugs 93 are so arranged on the drum 94 as to engage and throw the upper end of the lever 91 to the right just before a cutting operation. When the upper end of the lever 91 is thrown to the right, its lower end will move the shifting fork 90 to the left to force the dog clutch 86 into engagement with the gear 83. Now since the gear 83 is smaller than the gear 85 on the drive shaft 65, the latter will be rotated at a reduced rate of speed to move the sprocket chains 10, 10 slowly when the object held by the collet is being operated upon by the cutters 39. After the cutting operation is completed, however, one of the dogs 95 on the drum 94 will throw the upper end of the lever 91 to the left, whereupon its lower end will throw the dog clutch 86 to the right, into engagement with the dogs on the gear 87. Since the latter gear is larger than the pinion 88 on the shaft 65, the speed of the latter will be accelerated to move the sprocket chains 10, 10 at a more rapid rate of speed when the collet is traveling between two pairs of cutters. This speed will not be diminished until another cutting operation is to be performed, when the upper end of the lever 91 will be again thrown to the right by a dog 93. (See Figure 3).

Projecting inwardly from the middle portion of the lever 91 is an arm 96 having an inner end which inclines to a sharp edge from each side. This end of the arm 96 is adapted to be engaged by a roller 97 carried by the end of a horizontally movable plunger 98 within the bracket 92. Between the rear end of the plunger and the end portion of the bracket, is a coil spring 99 adapted to exert its force against the plunger to force the roller 97 along one inclined face of the lever arm 96 to hold the lever 91 in one extreme position, and along its other inclined face to hold said lever in its other extreme position. (See Figure 3.)

Referring to Figures 1, 2 and 3, the cutters 39 are rotated by the following means. Fast on each spindle 45 is a pulley 100 around which, and idle pulleys 101 below them, passes an endless belt 102. The belt 102 also passes around an idle pulley 103 to a drive pulley 104 mounted on the shaft 71. The cutters 39 are thus driven in unison by the belt and pulleys described.

In operation, a spark plug, nut or other object to be milled is placed in a collet after its plungers 31 engage the stationary members 36. After the plungers 31 are moved off the latter, the collet is carried by the sprocket chains 10, 10 to the first pair of cutters 39, 39 by which two faces on the object which it holds, are milled. During the milling operation, the collet is moved by the chains 10, 10 at a slow rate of speed for the reason that the upper end of the lever 91 which controls the speed of the feeding mechanism is thrown to the right by a lug 93 on the drum 94.

After a milling operation has been completed, the collet will be unlocked and turned by the mechanism hereinbefore described, to present two new faces of the object which the collet holds, to the next pair of cutters 39. Between the two pairs of cutters the speed of the collet will be accelerated by reason of the fact that the upper end of the lever 91 will be thrown to the left by a lug 93 on the drum 94 as soon as a cutting operation has been completed. After all the faces of the object held by the collet have been milled, it will be released from the latter as soon as the plungers 31 engage the annular elements 35ᵃ on the shaft 4.

I do not wish to be limited to the details of construction and arrangement herein shown and described, and any changes or modifications may be made therein within the scope of the subjoined claims.

Having described my invention, I claim:

1. In a device of the type described, the combination with a bed, of a series of cutters rotatably mounted on said bed, an endless carrier supported for movement past said cutters, a collet carried by said endless carrier, to hold an object in a position to be milled by the cutters as the endless carrier conveys it past them, an indexing mechanism for turning said collet, and the object that it holds, to a new position before a milling operation is performed upon the latter by a succeeding cutter, and automatic means for locking said collet in its new position, and unlocking it after a cutting operation has been performed so that it may again be turned by the indexing mechanism.

2. In a device of the type described, the combination with a bed, a pair of sprocket wheels rotatably mounted at each end of said bed, a pair of sprocket chains passing around said wheels, a collet secured to said chains, a spring within said collet, engaging means between said chains, and plungers adapted to compress the spring to permit the mouth portion of said collet to expand, the outer ends of said plungers adapted to be depressed by the engaging means as the collet is carried past them, for the purpose specified.

3. In a device of the type described, the combination with a bed, two pairs of sprocket wheels rotatably mounted at each end of said bed, a pair of sprocket chains passing around said wheels, a tubular casting secured to said sprocket chains, a rotatable collet carried by said casting, a flange on said casting, and a pair of track members between the upper portions of said wheels, upon which said flange is adapted to travel to support the collet during its movement between the upper portions of said wheels.

4. In a device of the type described, the combination with a bed, of two pairs of sprocket wheels rotatably mounted upon said bed, a pair of sprocket chains passing around said wheels, a tubular casting, a collet rotatably mounted in said casting, a flange around said casting, a pair of ears projecting inwardly from said flange, and pins projecting through apertures in said ears and the links of said sprocket chains, firmly to secure said casting to the latter.

5. In a device of the type described, the combination with a bed, of two pairs of sprocket wheels rotatably mounted upon said bed, a pair of sprocket chains passing around said wheels, a tubular casting secured to said chains, a sleeve rotatable in said casting, a split cylindrical holding member movable into and out of said sleeve, a movable collar into which the upper end of said holding member is fitted, the outer end of the split cylindrical member tapering outwardly for engagement with the converging mouth of the sleeve, a spring adapted to press against the collar to force the split cylindrical member inwardly to contract its mouth portion by reason of the engagement of its tapering end with the converging mouth portion of the sleeve, plungers adapted to press the collar outwardly against the pressure of said spring to enlarge the mouth portion of the split cylindrical member, and means between the chains adapted to depress said plungers when the tubular casting is passing them, for the purpose specified.

6. In a device of the type described, the combination with a bed, of a series of cutters rotatably supported by said bed, two pairs of sprocket wheels mounted upon said bed, a pair of sprocket chains passing around said wheels, means secured to said chains for carrying an object to be milled by said cutters, into successive engagement with them, means for rotating one pair of sprocket wheels to move said chains, and an automatic device for changing the speed of said rotating means, whereby, when the object is being milled by a cutter the chains will be moved slowly, and the speed thereof accelerated when the object is being conveyed from one cutter to another.

7. In a device of the type described, the combination with a bed, of a series of cutters rotatably mounted upon said bed, brackets on said bed, a pair of transverse shafts journaled in said brackets, a pair of sprocket wheels on each shaft, a pair of sprocket chains passing around said wheels, means secured to said chains for carrying an object to be milled by said cutters, into successive engagement with them, a worm wheel on the outer end of one sprocket shaft, a worm shaft for rotating the latter, a drive shaft operatively connected to the worm shaft, means for turning the drive shaft, and means on the outer end of the last named sprocket shaft, for varying the speed of the means for rotating the drive shaft, whereby, when the object is being milled by a cutter the chains will be moved slowly, and the speed thereof accelerated when the object is being conveyed from one cutter to another.

8. In a device of the type described, the combination with a bed, of a series of cutters rotatably mounted upon said bed, brackets on said bed, a pair of transverse shafts journaled in said brackets, a pair of sprocket wheels on each shaft, a pair of sprocket chains passing around said wheels, means secured to said chains for carrying an object to be milled by said cutters, into successive engagement with them, a worm wheel on the outer end of one sprocket shaft, a vertical worm shaft for rotating said worm wheel and through it the sprocket shaft, a horizontal drive shaft for rotating the worm shaft, a large and a small gear fast on said horizontal shaft, a counter shaft above the first shaft, means for rotating the counter shaft, a large gear loose on the counter shaft in mesh with the small gear on the first shaft, and a small gear loose on the counter shaft in mesh with the large gear on the first shaft, a dog clutch slidable along the counter shaft, adapted to engage the small or the large gear on the counter shaft, to cause either gear to be rotated by the counter shaft, and means on the outer end of the driven sprocket shaft, adapted to shift the dog clutch into engagement with either the large or the small gear on the counter shaft, whereby, when it engages the small gear on the latter shaft, the chains will be moved slowly for the cutting operation, and when it engages the large gear on the counter shaft, the speed of the chains will be accelerated to convey the object rapidly from one cutter to another.

9. In a device of the type described, the combination with a bed, of a series of cutters rotatably mounted upon said bed, brackets on said bed, a pair of transverse shafts journaled in said brackets, a pair of sprocket wheels on each shaft, a pair of sprocket chains passing around said wheels, means secured to said chains for carrying an object to be milled by said cutters, into successive engagement with them, a worm wheel on the outer end of one sprocket shaft, a vertical shaft for rotating the worm wheel and through it the sprocket shaft, a horizontal drive shaft for rotating the worm shaft, a large and a small gear fast on said horizontal shaft, a counter shaft above the first shaft, means for rotating the counter shaft, a large gear loose on the counter shaft in mesh with the small gear on the horizontal shaft, and a small gear loose on the counter shaft in mesh with the large gear on the horizontal shaft, a dog clutch slidable along the counter shaft, adapted to engage the small or the large gear on the counter shaft, to cause either gear to be rotated by the counter shaft, a lever for shifting the dog clutch into engagement with either the large or the small gear on the counter shaft, a drum on the outer end of the driven sprocket shaft, projections on one side of the periphery of said drum adapted to engage the outer end of said lever to throw the clutch into engagement with the small gear on the counter shaft, to effect a slow movement of the chains during a milling operation, and projections on the other side of the periphery of said drum adapted to engage the outer end of said lever to throw the clutch into engagement with the large gear on the counter shaft, to accelerate the movement of the chains when the object to be milled is traveling from one cutter to another.

10. In a device of the type described, the combination with a bed, of a series of cutters rotatably mounted upon said bed, brackets on said bed, a pair of transverse shafts journaled in said brackets, a pair of sprocket wheels on each shaft, a pair of sprocket chains passing around said wheels, means secured to said chains for carrying an object to be milled by said cutters, into successive engagement with them, a worm wheel on the outer end of one sprocket shaft, a worm shaft for rotating the latter, a drive shaft operatively connected to the worm shaft, means for changing the speed of the drive shaft, a lever for actuating said speed-changing means, means on the outer end of the driven sprocket shaft for moving the outer end of said lever to the right or to the left to select a slow or a rapid speed for the drive shaft, an arm on said lever whose free end inclines from each side to an edge, a spring-pressed plunger, and a roller on the outer end of said plunger adapted to be forced along either inclined edge face of the lever arm, to hold the lever in one of its extreme positions.

11. In a device of the type described, the combination with a bed, of an endless carrier movable over said bed, means secured to said carrier for carrying an object to be milled, transverse arbors beneath said carrier, cutters fast on said arbors, longitudinally and vertically adjustable spindles movable along said bed to receive the inner ends of said arbors to rotate them, sleeve members rotatably secured to the outer portion of said bed, and center devices telescoping into said sleeve members, to receive the outer ends of said arbors, for the purpose specified.

12. In a device of the type described, the combination with a bed, of a pair of sprocket wheels rotatably mounted at each end of said bed, a pair of sprocket chains passing around said wheels, a collet secured to said chains, a pair of longitudinal members between said wheels and chains, a spring within said collet, and plungers adapted to compress the spring to permit the mouth portion of said collet to expand, the outer ends of said plungers adapted to be depressed by the longitudinal members as the collet is carried past them, to permit the latter to receive an object to be milled.

In testimony whereof I have hereunto set my hand this 26th day of January, 1920.

ROBERT C. NEVIN.

Witness:
HOWARD S. SMITH.